(12) United States Patent
Ly

(10) Patent No.: US 9,037,367 B2
(45) Date of Patent: May 19, 2015

(54) SYSTEM AND METHOD FOR INHIBITING TOP GEAR AT WINDING ROAD DRIVING

(71) Applicant: Toyota Motor Engineering & Manufacturing North America, Inc., Erlanger, KY (US)

(72) Inventor: Tai J. Ly, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 44 days.

(21) Appl. No.: 13/928,992

(22) Filed: Jun. 27, 2013

(65) Prior Publication Data

US 2015/0006048 A1    Jan. 1, 2015

(51) Int. Cl.
    *F16H 61/16*    (2006.01)
(52) U.S. Cl.
    CPC .................................... *F16H 61/16* (2013.01)
(58) Field of Classification Search
    CPC ........................................................ F16H 61/16
    USPC ................................. 701/55, 58; 477/115, 903
    See application file for complete search history.

(56) References Cited

U.S. PATENT DOCUMENTS

| 5,428,531 | A | | 6/1995 | Hayafune | |
|---|---|---|---|---|---|
| 5,591,102 | A | * | 1/1997 | White et al. | 477/107 |
| 7,258,649 | B2 | * | 8/2007 | Matsunaga et al. | 477/120 |
| 7,684,919 | B2 | * | 3/2010 | AbuSamra | 701/54 |
| 2010/0100293 | A1 | | 4/2010 | Takanami | |

FOREIGN PATENT DOCUMENTS

| JP | H11336889 A | 12/1999 |
|---|---|---|
| JP | 2007010020 A | 1/2007 |
| JP | 4603458 B2 | 12/2010 |
| JP | 2011069434 A | 4/2011 |

* cited by examiner

*Primary Examiner* — Edwin A Young
(74) *Attorney, Agent, or Firm* — Gifford, Krass, Sprinkle, Anderson & Citkowski, P.C.

(57) ABSTRACT

A control system having at least one sensor collecting data from a vehicle component such as a steering wheel. A processor determines if the data collected from the sensor is above or equal to a predetermined level. If the processor determines that the data is above a predetermined level, the processor indicates to the controller that the data is above that predetermined level and requires a prevention of upshifting of the transmission. A method of including controlling the transmission of a vehicle by a control system, sensing at least one vehicle property by a sensor in acquiring data relating to that property, storing the data in a data storage unit, determining if the data is above a predetermined level and sending a signal to a transmission of the vehicle if the data is above a predetermined level thereby preventing upshift of the transmission to the top two gears.

10 Claims, 2 Drawing Sheets

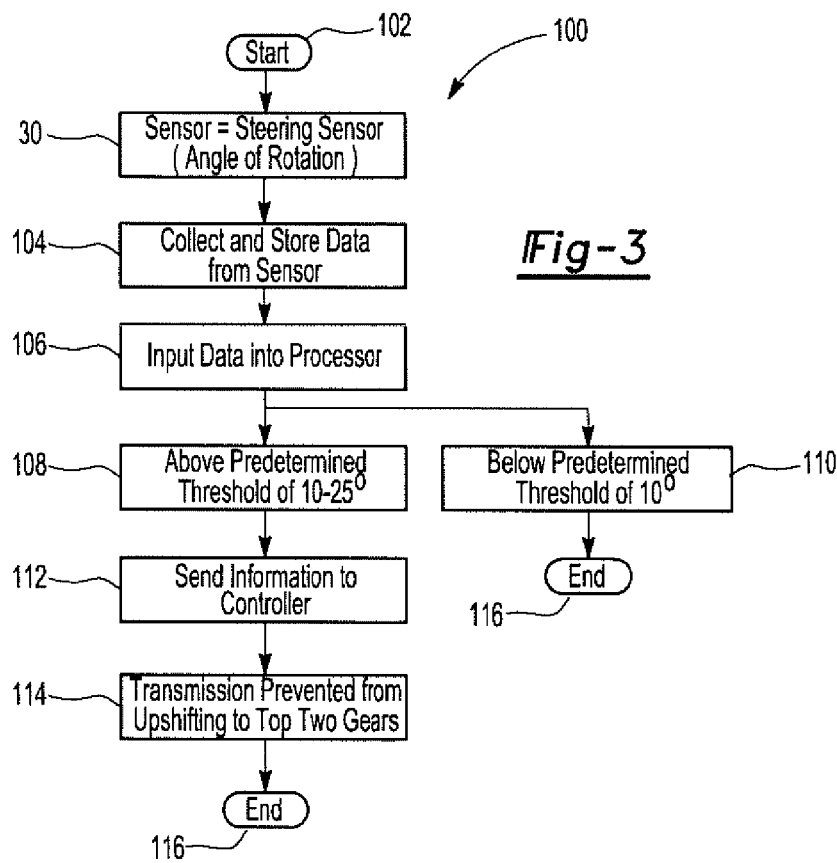
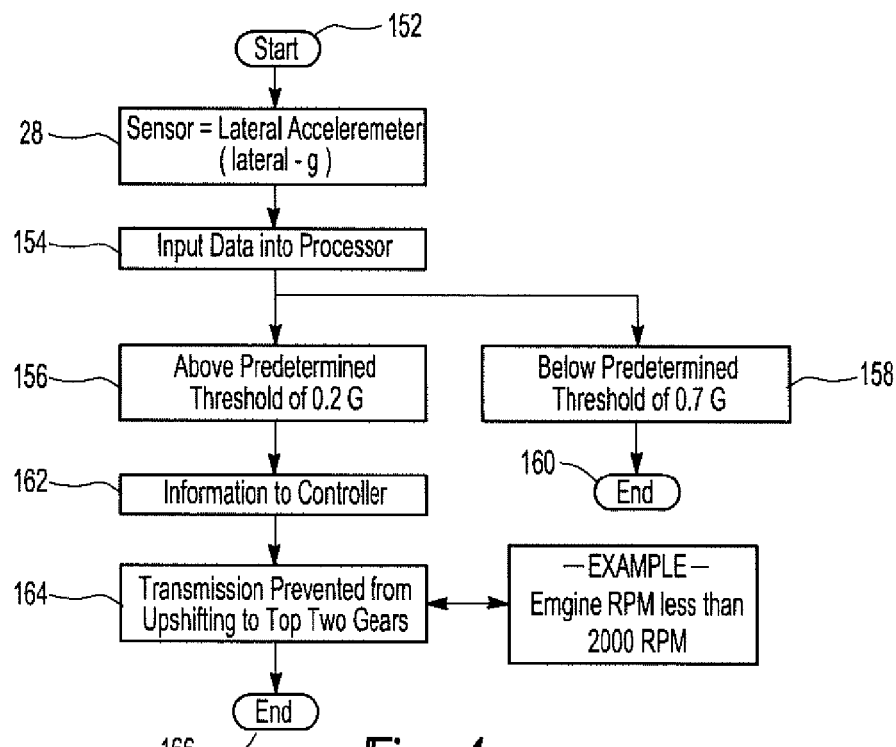

SYSTEM AND METHOD FOR INHIBITING TOP GEAR AT WINDING ROAD DRIVING

FIELD OF THE INVENTION

The present invention relates generally to control systems for a vehicle. More particularly, the present invention relates to a control system for preventing upshifting of a transmission if on a winding road.

BACKGROUND OF THE INVENTION

Automatic transmission systems in vehicles automatically switch to a higher gear as the vehicle speed increases. However, there are times when the automatic transmission shifts to a higher gear at an undesirable time and location. When the driver is driving on a winding or curving road, it is undesirable to upshift to the top gear, or one of the top gears, the automatic transmission. As such, there exists a need in the art to provide an apparatus in control system to detect winding road situations and to prevent automatic upshift to a higher gear during these winding road conditions.

SUMMARY OF THE INVENTION

The present invention provides for a control system having at least one sensor. The sensor collects data from a vehicle component such as a steering wheel and/or lateral G sensor. The data collected from the sensor is stored in a data storage unit. A processor is used to determine if the data collected from the sensor is above or equal to a predetermined level. If the processor determines that the data is above or equal to a predetermined level, the processor indicates to the controller that the data is at or above that predetermined level and requires a prevention of upshifting of the transmission.

A method of the present invention includes controlling the transmission of a vehicle by a control system. The method including the steps of sensing at least one vehicle property by a sensor in acquiring data relating to that property, storing the data in a data storage unit, determining if the data is at or above a predetermined level and sending a signal to a transmission of the vehicle if the data is at or above a predetermined level thereby preventing upshift to a top gear of the transmission if the data is at or above the predetermined level.

BRIEF DESCRIPTION OF THE DRAWINGS

FIG. 3 illustrates an exemplary model of the method of the present invention;
and
FIG. 4 illustrates an alternative exemplary model of the method of the present invention.

DETAILED DESCRIPTION OF THE INVENTION

The present invention relates to a control system and method for preventing upshift to a top gear of the automatic transmission of a vehicle if it is determined that the vehicle is driving on a winding road. The system prevents upshift to either a higher gear, or to at least one of the top two gears. The prevention of upshift to the top two gears improves efficiency of the vehicle, including fuel economy. The vehicle detects a high frequency of lateral G and/or steering input for an extended period of time. If the vehicle detects these properties, the vehicle will inhibit upshift to the top gear. The prevention of upshift to a top gear will keep the vehicle above a preset RPM to improve drivability. The various sensors of the vehicle will measure lateral G, steering input, pedal usage, vehicle speed, brake usage and evaluate the data produced by the various sensors. If the data evaluated is determined to be data relating to a winding road, the vehicle will be prevented from upshifting the automatic transmission to a higher gear.

Figure 1:
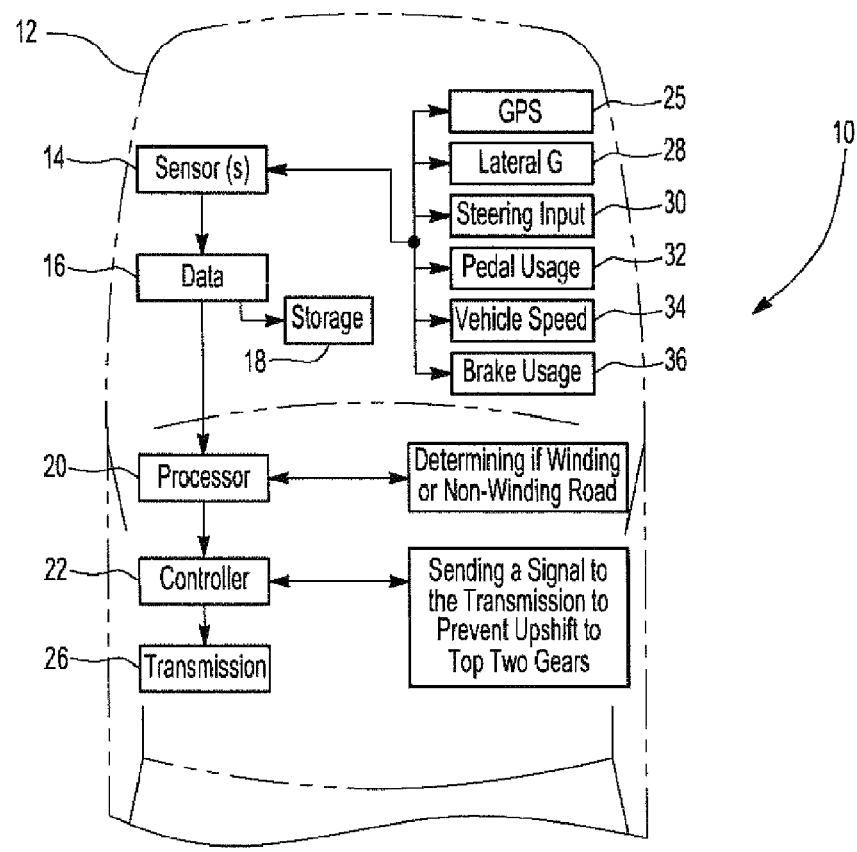
FIG. 1 illustrates the system of the present invention.

FIG. 1 illustrates the control system 10 on a vehicle 12. The system includes a sensor 14 operable to measure a certain characteristic about a vehicle component. The sensor may be associated with various vehicle components such as the vehicle steering wheel, tire rotation, brake pedal, accelerator pedal or other various sensors associated with vehicle components.

The sensor 14 produces data 16 based on the sensor 14 measurements. Data 16 is stored in a data storage unit 18. The data 16 is either sent directly to the processor 20 or sent to be stored in the data storage unit 18. The processor 20 determines if the data meets a predetermined level. The predetermined level varies depending on the type of sensor 14 utilized in the system. The processor determines if the predetermined level is at or above a certain predetermined level. Based on the predetermined level set by the user, the processor determines if the vehicle is on a winding road. In the present invention, the processor is a computer capable of making determinations if the data read from the sensor meets a predetermined level. The processor looks to a set of data or a data point and electronically compares the set of data or the data point to the predetermined level. A lookup table may also be used by the processor to determine if the data meets the predetermined level. If the processor determines that the set of data or the data point meets the predetermined level, the processor accordingly determines that vehicle is on a winding road. In other words, if the set of data or the data point meets the predetermined level, then the processor automatically assumes that the vehicle is on a winding road.

The processor also looks to multiple sets of data or data points from different sensors. If the vehicle has 2 sensors (either measuring the same thing or different measurements), the vehicle collects data from both sensors. Both data sets are sent to the processor for the processor to determine if the data sets each meet their respective predetermined levels. In one embodiment, if at least one data set meets the predetermined level, then the processor determines that the vehicle is on a winding road. Priority may be given to specific sensors. By way of example, if data from the lateral G sensor meets the predetermined level but data from the steering angle sensor does not meet the predetermined level, then the processor will determine that the vehicle is not on a winding road. Conversely, if it is determined that the set of data from the steering angle sensor does meet the predetermined level, but data from the lateral G sensor does not meet the predetermined level, then the processor may determine that the vehicle is on a winding road. These parameters and logic are predetermined and inputted into the vehicle processor. Other embodiments include the requirement of all sensors of the system meeting the predetermined levels.

The processor 20 is operable to compare a data set from a sensor to a predetermined level. The processor 20 functions so as to take a first set of data (or a data point) and compare it with a predetermined level (or predetermined range of levels or predetermined data). The predetermined levels may be stored for comparison by the processor in a look-up table. If the processor determines a match between the predetermined level and the data set, then the processor determines and reaches the conclusion that the vehicle is on a winding road. When the processor makes the determination that the vehicle is on a winding road, then the processor communicates with the controller of the transmission (and to the transmission) to prevent and/or stop upshift of the transmission to the top two gear(s).

If the processor 20 determines that the vehicle is on a winding road, it sends a signal to the controller 22 operable to control the automatic transmission 26. The controller 22 sends a signal to the automatic transmission to prevent upshift of the automatic transmission if the processor determines that the vehicle is on a winding road. The controller 22 sends a signal to the automatic transmission 26 if the data 16 received by the processor 20 is determined to be at or above a predetermined level. The predetermined level will depend based on the requirements of the user and based on the type of sensor being used.

The sensor 14 may be associated with various vehicle components. In a one embodiment, a lateral G sensor 28 is utilized to create a set of data 16. The lateral G sensor determines the G force on the vehicle. The user or programmer is capable of setting a predetermined level associated with conditions of driving on a winding road. It is common for vehicles to have a preexisting lateral G sensor to measure lateral G forces on the vehicle. The faster a user goes around a corner, the higher the lateral G force will be. Typically, anything over 0.2 G is a considered a turn (light turn) and 0.7 G is a high (sharp turn). A user moving forward making turns in a very straight direction will result in a 0 G reading. In the present invention, if the lateral G is at a predetermined level of between 0.2 and 0.7 G (wherein 1 G=9.8 m/s), then the processor determines that the data meets a predetermined level, sends a signal to the controller which in turn sends signal to the transmission to prevent upshift of the vehicle transmission. The lateral G sensor 28 may be positioned at various points in the vehicle. The lateral G sensor may also be an accelerometer or motion sensor.

Furthermore, a GPS sensor 25 or system may be used to determine if the user is on a winding road. A process is operable to determine based on the associated GPS map if the user is on a winding road, or a road with a plurality of sharp curves. A data storage unit is in communication with the navigation or GPS system to store data relating to the winding road. A processor determines if the road is significantly winding, or not. If the processor determines if the road is winding based on the GPS data, then a controller sends a signal to the transmission to prevent upshifting to the top, or top two, gears.

The sensor 14 may also be a steering input sensor 30. The steering sensor 30 measures the angle of rotation of the steering wheel. In this embodiment, the steering sensor 30 measures the angle of rotation of the steering wheel when in use by the driver to determine if the driver is driving on a winding road. In this example, the predetermined level of the angle of rotation of the steering sensor 30 varies between 10 to 25 degrees. If the steering angle is less than 10°, no signal is sent to the automatic transmission. If the predetermined level of 10 to 25 degrees is met or exceeded, the controller sends a signal to the transmission to prevent upshift of the automatic transmission 26.

Sensor 14 may also be a pedal usage sensor 32. The pedal usage sensor 32 may be used to calculate speed or angle of depression of the pedal. By way of example, if the pedal sensor 32 measures angles of depression of the pedal, the predetermined level may range between 10 to 50 degrees displacement. If the processor determines that the predetermined level is at or exceeds 10 to 50 degrees of displacement, then the controller 22 sends a signal to the automatic transmission 26 to prevent upshift of the automatic transmission.

The sensor 14 may also be a speed or acceleration sensor 34. The speed sensor 34 will likely measure speed as a ratio of distance with respect to time, such as miles per hour. By way of example, the vehicle speed sensor 34 may determine that a vehicle is on a winding road if the vehicle speed is decreasing or increasing. By way of example, if the vehicle speed reaches above a predetermined level of between 25 miles per hour to 50 miles per hour, or is below or decreasing to a level of below 10 miles per hour to 50 miles per hour, the controller may send a signal to the transmission to prevent upshift of the automatic transmission.

The sensor 14 may also be a brake usage sensor 36 to determine if the user is frequently braking. The brake usage sensor 36 may be used to determine if the user is braking around a plurality of curves thus suggesting a winding road. Alternatively, if the user is riding the brakes, this may also suggest condition of a winding road. If the brake usage sensor detects frequent usage of the brake, such as a predetermined level of between one to five brake depressions per 10 seconds, then the processor will determine that the user is on a winding road. The processor 20 will then send a signal to the controller 22 to send a signal to the automatic transmission 26 to prevent upshift of the vehicle because it is on a winding road. The processor 20 will then send a signal to the controller 22 to send a signal to the automatic transmission 26 to prevent upshift of the vehicle because it is on a winding road.

Figure 2:
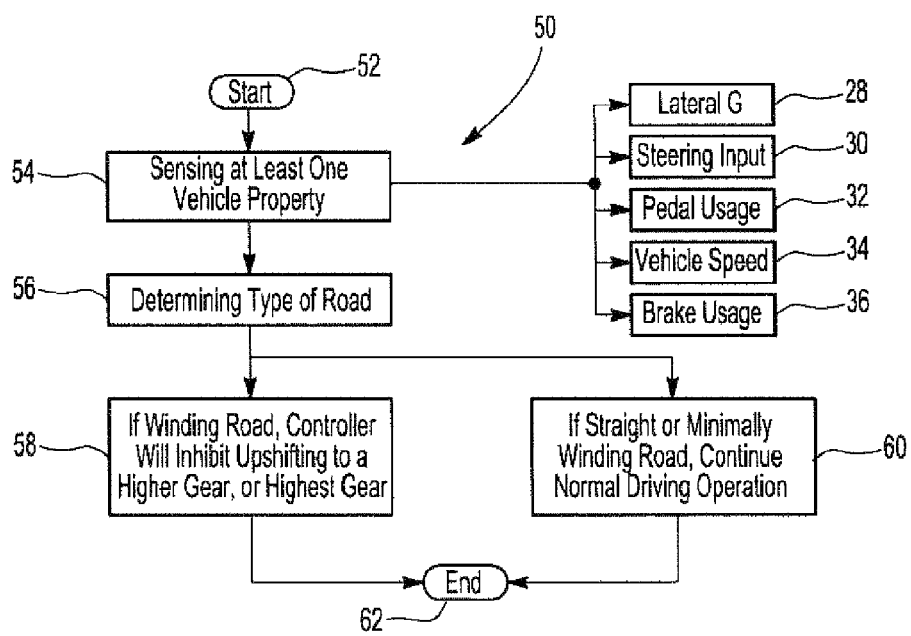
FIG. 2 illustrates the method of the present invention.

FIG. 2 illustrates the method 50 of the present invention. The method 50 includes the steps of starting 52 of the process 10. The method further includes the steps of sensing at least one vehicle property or set of data. This is indicated by reference numeral 54. The sensing 54 is carried out by way of the sensor 14. The sensor 14 may be a lateral G sensor 28, a steering input sensor 30, a pedal usage sensor 32, a vehicle speed sensor 34, or a brake usage sensor 36. This data is inputted and received by the sensor 14.

The method 50 further includes the step of determining 56 the type of road. If it is determined by the processor 20 that the road is a winding road, the controller will inhibit upshifting to a higher gear 58. If the processor 20 determines that the road is straight or a minimally winding road, the processor will suggest continued operation and not send a signal to the controller and thus, to the transmission. This is indicated by reference numeral 60. The processes then ends 62.

By way of example, FIG. 3 illustrates the method 100 illustrates a method taken when a steering angle sensor or steering input sensor 30 is utilized. The method 100 includes the step of starting the process 102. The sensor 30, or sensor 14 is used to measure the angle of rotation. Data is collected 104 and stored in a data storage unit 18. The data is collected 104 from the sensor 14, 30. The method 100 further includes the step of inputting 106 data into a processor 20. If the processor determines that the steering angle sensor is above the predetermined threshold 108 of 10 to 25 degrees, then the processor sends information 112 to the controller to prevent 114 transmission from upshifting to a higher gear 114. The process then ends 116. If the processor determines that the data is below the predetermined threshold of 10°, the process then ends 116. This step is illustrated at reference numeral 110.

The sensor 14 may also be a combination of the various sensors such as the lateral G sensor 28, the steering input sensor 30, the pedal usage sensor 32, the vehicle speed sensor 34, or the brake usage sensor 36. By way of example, data from the lateral G sensor 28 and the steering input sensor 30 may be used by the processor and stored within the data storage unit 18. If the processor determines that data from both the lateral G sensor 28 and the steering input sensor 30 is at or above a predetermined level, the processor will send a signal to the controller 22 and thus to the transmission 26 to prevent upshift of the vehicle. If the processor determines that the lateral G data is at or above the predetermined level, but determines the data from the steering input sensor 30 is below the predetermined level, then the processor will not send a signal to the controller to prevent upshift of the vehicle.

Alternatively, if data from the lateral G sensor 28 is at or above the predetermined level, but data from the steering input sensor 30 is below the predetermined level, the processor may still, depending on the requirements by the user, send a signal to the controller and thus to the transmission thereby preventing upshift of the vehicle. These variances and arrangements will depend on the requirements of the user.

FIGS. 1 and 4 illustrates an exemplary method wherein the sensor 14 is a lateral accelerometer, or lateral G sensor 28. The method starts 152 by acquiring data from the lateral G sensor 28. The method then includes the step of inputting 154 the data into a processor 20. If the processor determines that the data from the lateral G sensor 28 is at or above the predetermined threshold of 0.2 G, then information 162 is sent to the controller and thus sent to the transmission to prevent the automatic transmission from upshifting gears. This is illustrated at reference numerals 156, 162, 164. The process then ends 166. If the processor 20 determines that data from the lateral G sensor 28 is below the predetermined threshold of 0.7 G, as shown by reference numeral 158, the process then ends 160.

The invention is not restricted to the illustrative examples and embodiments described above. The embodiments are not intended as limitations on the scope of the invention. Methods, apparatus, composition, and the like described herein are exemplary and not intended as limitations on the scope of the invention. Changes therein and other uses will occur to those skilled in the art. The scope of the invention is defined by the scope of the attended claims.

The invention claimed is:

1. A control system for use in a vehicle, the control system comprising:
   at least one sensor, the sensor collecting data from a vehicle component, the sensor being at least one of the following: a lateral-g sensor, a displacement sensor, a steering angle sensor or a speed sensor;
   a data storage unit, the data storage unit storing data collected from the sensor;
   a processor to determine if the data is above or equal to a predetermined level by comparing the data to the predetermined level the processor in communication with a controller connected to a transmission, if the processor determines that the data is above or equal to the predetermined level, the processor communicates to the controller that the data is at or above the predetermined level, the controller communicates to the transmission to prevent upshifting of the transmission to a top two gears.

2. The control system of claim 1 wherein the sensor is the lateral-g sensor wherein the predetermined level is between 0.2-0.7 G.

3. The control system of claim 1 wherein the vehicle component is a pedal assembly.

4. The control system of claim 1 wherein the sensor is the pedal displacement sensor wherein the pedal displacement sensor is a brake pedal sensor.

5. The control system of claim 1 wherein the sensor is the displacement sensor wherein the displacement sensor is an accelerator pedal sensor.

6. A method of controlling a transmission of a vehicle by a control system, the method comprising the steps of:
   sensing at least one vehicle property of a vehicle component by a sensor, acquiring data relating to that property, the sensor being at least one of the following: a lateral-g sensor, a displacement sensor, a steering angle sensor or a speed sensor;
   storing the data in a data storage unit;
   determining if the data is at or above a predetermined level, determining by means of a processor;
   sending a signal to the transmission of the vehicle if the data is at or above the predetermined level;
   preventing upshift to a top two gears of the transmission if the data is at or above the predetermined level.

7. The method of claim 6 wherein sensor is the lateral-g sensor wherein the predetermined level is between 0.2-0.7 G.

8. The method of claim 6 wherein the vehicle component is a pedal assembly.

9. The method of claim 6 wherein the sensor is the displacement sensor wherein the displacement sensor is a brake pedal sensor.

10. The method of claim 6 wherein the sensor is the displacement sensor wherein the displacement sensor is an accelerator pedal sensor.

* * * * *